(12) United States Patent
Motoyama (10) Patent No.: US 8,312,775 B2
(45) Date of Patent: Nov. 20, 2012

(54) DIAPHRAGM FOR PRESSURE SENSOR AND PRESSURE SENSOR

(75) Inventor: Hisao Motoyama, Minamisoma (JP)

(73) Assignee: Seiko Epson Corporation (JP)

( * ) Notice: Subject to any disclaimer, the term of this patent is extended or adjusted under 35 U.S.C. 154(b) by 833 days.

(21) Appl. No.: 12/481,675

(22) Filed: Jun. 10, 2009

(65) Prior Publication Data
US 2009/0308168 A1 Dec. 17, 2009

(30) Foreign Application Priority Data

Jun. 11, 2008 (JP) .................................. 2008-153361
Feb. 9, 2009 (JP) .................................. 2009-027764

(51) Int. Cl.
*G01L 9/08* (2006.01)
(52) U.S. Cl. ........................................................ 73/717
(58) Field of Classification Search ................... 73/715, 73/716, 717
See application file for complete search history.

(56) References Cited

U.S. PATENT DOCUMENTS

| | | | |
|---|---|---|---|
| 4,215,570 A | 8/1980 | Eer Nisse | |
| 4,321,500 A | 3/1982 | Paros et al. | |
| 4,372,173 A | 2/1983 | Eer Nisse et al. | |
| 4,375,182 A | 3/1983 | Zavoda | |
| 4,382,385 A | 5/1983 | Paros | |
| 4,384,495 A | 5/1983 | Paros | |
| 4,406,966 A | 9/1983 | Paros | |
| 4,455,874 A | 6/1984 | Paros | |
| 5,140,733 A | 8/1992 | Shimada et al. | |
| 5,503,023 A | 4/1996 | Benedikt et al. | |
| 6,497,152 B2 | 12/2002 | Paros et al. | |
| 6,595,054 B2 | 7/2003 | Paros et al. | |
| 7,779,700 B2 * | 8/2010 | Motoyama | 73/717 |
| 7,895,896 B2 * | 3/2011 | Motoyama | 73/721 |
| 7,942,062 B2 * | 5/2011 | Motoyama | 73/717 |
| 8,015,881 B2 * | 9/2011 | Motoyama | 73/717 |
| 8,091,431 B2 * | 1/2012 | Motoyama | 73/717 |

FOREIGN PATENT DOCUMENTS

| | | |
|---|---|---|
| CN | 87 1 04155 | 11/1987 |
| CN | 1707231 | 12/2005 |
| JP | 56-119519 | 9/1981 |
| JP | 57-177146 | 11/1982 |
| JP | 63-165543 | 10/1988 |
| JP | 64-09331 | 1/1989 |
| JP | 64-086608 | 3/1989 |
| JP | 02-099333 | 8/1990 |
| JP | 02-228534 | 9/1990 |
| JP | 07-019981 | 1/1995 |
| JP | 10-052764 | 2/1998 |
| JP | 3099894 | 8/2000 |
| JP | 2004-347387 | 12/2004 |

(Continued)

*Primary Examiner* — Freddie Kirkland, III
(74) *Attorney, Agent, or Firm* — Harness, Dickey & Pierce, P.L.C.

(57) ABSTRACT

A diaphragm for a pressure sensor includes: a central section serving as a diaphragm body, the central section including: an external surface deformed upon receipt of an external pressure; and an internal surface transmitting a force to a pressure sensitive element inside a housing of the pressure sensor; a peripheral section that is an exterior of the central section and welded to an outer circumference of a pressure input orifice that is provided to the housing; and a step wall provided between the central section and the peripheral section. The central section and the peripheral section are integrally and concentrically provided. The diaphragm seals the pressure input orifice.

12 Claims, 8 Drawing Sheets

FOREIGN PATENT DOCUMENTS

| | | |
|---|---|---|
| JP | 2005-017050 | 1/2005 |
| JP | 2005-106527 | 4/2005 |
| JP | 2005-106528 | 4/2005 |
| JP | 2005-121628 | 5/2005 |
| JP | 2006-194736 | 7/2006 |
| JP | 2007-057395 | 3/2007 |
| JP | 2007-132697 | 5/2007 |
| JP | 2008-232886 | 10/2008 |

* cited by examiner

DIAPHRAGM FOR PRESSURE SENSOR AND PRESSURE SENSOR

BACKGROUND

1. Technical Field

The present invention relates to a diaphragm for a pressure sensor and to a pressure sensor having the diaphragm. The invention is particularly suitable for suppression of aging deterioration of the diaphragm.

2. Related Art

Pressure sensors that use a piezoelectric resonator as a pressure sensitive element are known as a water pressure gauge, an air gauge, and a differential pressure gauge. The piezoelectric resonator includes, for instance, an electrode pattern on a plate-like piezoelectric substrate, and a direction in which a force is detected is set to be a detecting axis. When pressure is applied in the direction of the detecting axis, a resonance frequency of the piezoelectric resonator changes, and the pressure is detected by using the changes in the resonance frequency. JP-A-56-119519, JP-A-64-9331, and JP-A-2-228534, as a first, second, and third examples, disclose a pressure sensor including a piezoelectric resonator as a pressure sensitive element. When a pressure is applied to bellows from a pressure input orifice, a force F corresponding to an effective area of the bellows is transmitted to the piezoelectric resonator as a compressive force or a tensile force through a force transmitting unit that has a pivot as a fulcrum (a flexible hinge). A stress corresponding to the force F is generated in the piezoelectric resonator, and this stress changes the resonance frequency. The pressure sensor measures the pressure by detecting changes in the resonance frequency of the piezoelectric resonator.

Figure 10:
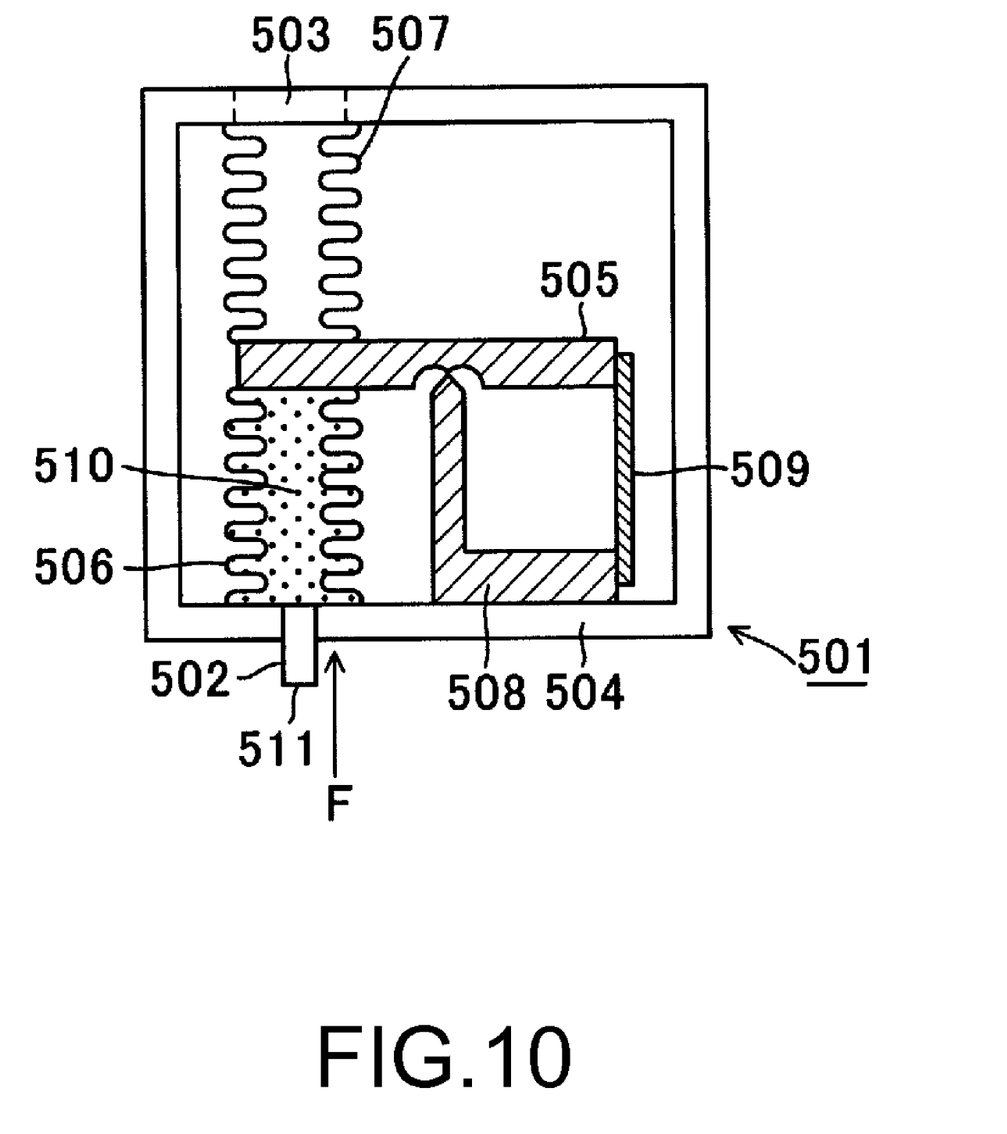
FIG. 10 is a sectional view of an exemplary structure of a pressure sensor according to related art examples.

A pressure sensor of related art will be described with reference to the first example and the like. FIG. 10 is a schematic view showing a structure of the related art pressure sensor.

With reference to FIG. 10, a pressure sensor 501 according to the related art includes a case 504 having first and second pressure input orifices 502 and 503 that are arranged to face each other, and a force transmitting member 505 disposed inside the case 504. One end of the force transmitting member 505 is sandwiched between and coupled to one end of a first bellows 506 and one end of a second bellows 507. The other end of the first bellows 506 is coupled to the first pressure input orifice 502, and the other end of the second bellows 507 is coupled to the second pressure input orifice 503. Moreover, a double-ended tuning fork resonator 509 serving as a pressure sensitive element is disposed between the other end of the force transmitting member 505 and an end of a substrate 508 which is an opposite end from a pivot (fulcrum).

The bellows of this pressure sensor is filled with a liquid so as to detect pressure with high precision. Generally, an oil such as silicon oil having high viscosity is used as the liquid in order to prevent bubbles from entering and accumulating inside the bellows or between the folds of the bellows.

Thus, the interior of the first bellows 506 is filled with oil 510 having viscosity. When the object of pressure measurement is a liquid, the oil 510 faces and contacts the liquid at an opening 511 opened at the first pressure input orifice 502. The size of the opening 511 is set such that the oil 510 does not leak out.

In the pressure sensor 501 having such a structure, a pressure F is applied from the liquid subjected to pressure measurement to the oil 510 filling the first bellows 506. The pressure F is then applied to the one end of the force transmitting member 505 (a pivotably supported swing arm) through the first bellows 506. At the same time, atmospheric pressure is applied to the second bellows 507, and a force equivalent to the atmospheric pressure is applied to the one end of the force transmitting member 506.

Consequently, a force equivalent to a differential pressure is applied through the other end of the force transmitting member 505 to the double-ended tuning fork resonator 509 as a compressive force or a tensile force, using the pivot of the substrate 508 as a pivoting point. The differential pressure here means a pressure difference between the atmospheric pressure and the pressure F applied by the liquid that is subjected to pressure measurement. When the compressive force or the tensile force is applied to the double-ended tuning fork resonator 509, a stress is generated in the resonator 509. In accordance with the strength of the stress, the resonance frequency of the resonator 509 changes. Therefore, the strength of the pressure F is detected by measuring the resonance frequency.

JP-A-2005-121628 as a fourth example discloses a sensor that does not include an expensive force transmitting unit (a cantilever), which is used in the pressure sensor mentioned above, having a swing arm with the pivot (the flexible hinge) used as the fulcrum. In this sensor, two bellows are collinearly aligned in a sensor housing while sandwiching a pedestal therebetween. From a behavior of the pedestal in an expansion and contraction direction of the bellows, the sensor detects pressure fluctuation that is caused by the difference between pressures introduced to each of the bellows. The pedestal for bonding the resonator is therefore sandwiched between one end of the first bellows and one end of the second bellows, and both ends of a pressure sensitive element provided at a circumference side of the second bellows are fixed respectively on the pedestal and on a housing wall on a side adjacent to the other end of the second bellows. Additionally, a reinforcing plate is disposed axisymmetrically to the pressure sensitive element, with the second bellows interposed therebetween. Both ends of the reinforcing plate are fixed on the pedestal and on the housing wall.

JP-A-2007-57395 as a fifth example discloses a pressure sensor including a reinforcing flexible member (namely, a string) that connects a pedestal to a housing and is disposed in a direction orthogonal to a direction of a pressure-detecting axis. The reinforcing flexible member is provided so as to solve a problem that the sensor disclosed in the fourth example has an insufficient strength against a shock coming from a direction orthogonal to a direction of a pressure-detecting axis of the bellows.

JP-A-2006-194736 and JP-A-2007-132697 as sixth and seventh examples disclose a pressure sensor that is used in a fixed manner to an engine block so as to detect hydraulic pressure inside an engine. This pressure sensor includes: a sensing unit that outputs an electric signal corresponding to an applied pressure, a pressure receiving diaphragm unit that receives pressure, and a pressure transmitting member that transmits the pressure from the diaphragm unit to the sensing unit. Specifically, a first diaphragm for receiving pressure is installed on one end surface of a hollow metal stem, and a second diaphragm for detection is installed on the other end surface of the hollow metal stem. The pressure transmitting member is provided between the first and second diaphragms in the stem. The pressure transmitting member is a shaft made of metal or ceramic, and is provided between the pair of diaphragms in a prestressed state. Moreover, a chip with a function of a strain gauge as a pressure detection element is attached to an outer end surface of the second diaphragm. The pressure transmitting member transmits pressure received by the first diaphragm to the second diaphragm, and deformation of the second diaphragm is converted into an electronic signal by the strain gauge chip, thereby detecting the hydraulic pressure of the engine.

JP-A-2005-106527 and JP-A-2005-106528 as eighth and ninth examples disclose a pressure sensor which includes a diaphragm that seals a pressure input orifice of a housing containing a pressure sensitive element. A structure disclosed in these examples is such that the diaphragm is weld-attached by laser welding or electron beam welding. When welding, a ring-shaped bead (a welded and solidified portion) is formed at a portion where the diaphragm is welded to the housing.

In the pressure sensor of the first to third examples as shown in FIG. 10, the first bellows 506 is filled with the oil 510. However, the oil 510 has a higher thermal expansion coefficient compared to those of other components constituting the pressure sensor 502 such as the force transmitting member 505 and the double-ended tuning fork resonator 509. Therefore, these components may become thermally deformed due to a temperature change. Such thermal deformation is an unwanted stress to the double-ended tuning fork resonator 509 and induces errors in measurement of pressure values. Thus, the characteristics of the pressure sensor are degraded.

Moreover, since the oil 510 filling the first bellows 506 contacts and faces the liquid subjected to the pressure measurement, the oil 510 may flow into the liquid, or the liquid may flow into the first bellows 506, depending on how the pressure sensor is installed. This may generate bubbles inside the oil 510 filling the first bellows 506. If bubbles are generated in the oil 510 that serves as a pressure transmitting medium, a force cannot be stably transmitted through the force transmitting member 505 to the double-ended tuning fork resonator, thereby possibly inducing errors in the pressure value measurement.

Also, as described above, since the oil 510 contacts and faces the liquid subjected to pressure measurement, the oil 510 may flow into the liquid depending on how the pressure sensor is installed. Therefore, the related art pressure sensor using the oil 510 is not applicable to measurement of pressure of a pure liquid that dislikes foreign substances.

Furthermore, it is difficult to miniaturize the pressure sensor 502 of the related art because it includes the force transmitting member 605 having a complicated structure. Also, because the force transmitting member 505 needs a flexible hinge having a slim constriction and is thus an expensive component, the manufacture of the pressure sensor becomes costly.

The pressure sensor of the fourth and fifth examples has a problem that, when the pressure sensor is inclined, the bellows thereof droops. The force applied to the pressure sensitive element (the double-ended tuning fork resonator) therefore changes, leading to fluctuation of the resonance frequency.

The structure of this pressure sensor is such that one end of a pipe filled with oil is coupled to a pressure introduction orifice of the pressure sensor, and that the other end of the pipe is in contact with the liquid to be measured. Therefore, as is the case with the first to third examples, the oil filling the bellows or the pipe contacts and faces the liquid subjected to pressure measurement. Accordingly, the oil may flow into the liquid subjected to pressure measurement or the liquid may flow into the bellows, depending on how the pressure sensor is installed. Therefore, bubbles may be generated in the oil filling the bellows. If bubbles are generated in the oil, the oil serving as a pressure transmitting medium does not stably transmit the pressure through the pedestal to the double-ended tuning fork resonator, resulting in errors in the pressure measurement.

In the pressure sensor of the fifth example, the pedestal sandwiched between the bellows is supported by the reinforcing flexible member that is a plate spring provided at a lateral surface of the housing. Therefore, a suppressing force is likely to affect the pedestal's behavior that is accompanied by the movement of the bellows in the axis direction. Therefore, pressure detecting sensitivity may be decreased. Also, if the reinforcing flexible member is hardened in order to strengthen its support, the movement of the bellows is suppressed, thereby decreasing the pressure detecting sensitivity.

Furthermore, in the fourth and fifth examples, the reinforcing plate is disposed axisymmetrically to the pressure sensitive element, with the bellows interposed therebetween. Therefore, the movement of the bellows is suppressed, thereby decreasing the pressure detecting sensitivity.

In the sixth and seventh examples, the diaphragm and the shaft are in contact with each other in the prestressed state, and the pressure sensor is used at high temperature and pressure. Therefore, if the diaphragm and the shaft are rigidly fixed, the mechanism may be damaged by thermal expansion that is different among the components. The diaphragm and the shaft have only a point contact in order to avoid the thermal expansion and are not bonded by a bonding means such as an adhesive. Therefore, there is a very high possibility that this contact point deviates when the diaphragm and the shaft operate due to the pressure changes. As the contact point deviates, a force acting on both the diaphragm and the shaft leaks out, resulting in less accurate pressure detection. Moreover, because the pressure sensor of the sixth and seventh examples is used at high temperature and pressure, it is desirable that the force transmitting member be as long as possible in order to create a distance between the pressure receiving unit and the sensing unit and to avoid thermal influence on the components such as the chip of the sensing unit. Accordingly, the sensor of these examples is not suitable for miniaturization. In addition, in the sixth and seventh examples, a force is transmitted through the shaft disposed between the pair of diaphragms. However, since a sensor chip is mounted on one of the diaphragms on a sensing unit side, the property of the diaphragms differs between the pressure receiving side and the sensing unit side. Therefore, the measurement accuracy may not be increased.

Furthermore, the pressure sensor in the eighth and ninth examples is such that, when the laser or electron beam irradiation is stopped, the bead becomes thermally deformed due to rapid cooling and is therefore highly susceptible to cracks and the like. If a pressure sensor having such a diaphragm is used, the bead becomes repeatedly deformed because of recurring deformation of the diaphragm that receives pressures from outside. This makes the cracks to grow, leading to problems such as aging deterioration and damages in the diaphragm.

Additionally, the diaphragm that is thermally expanded by the heat from the laser irradiation contracts as it cools down after the laser irradiation is stopped. A residual stress generated at this time is concentrated on a central area of a pressure receiving part of the diaphragm, and the central area is non-uniformly deformed, leading to decrease in the sensitivity of the pressure sensor.

Furthermore, since the welding portion welds at a high welding temperature, it is exposed to high temperature in the laser irradiation and is therefore susceptible to brittle fracture.

SUMMARY

An advantage of the invention is to provide a diaphragm that bends and deforms upon receipt of a pressure, in particular to a diaphragm for a pressure sensor which is configured such that a portion joining the diaphragm to a housing of the pressure sensor is not susceptible to stress. The diaphragm allows suppression of aging deterioration, fewer occurrences of nonuniform compressive stress, and less susceptibility to brittle fracture. Another advantage of the invention is to provide a pressure sensor including this diaphragm. The pressure sensor does not use an oil that is a pressure receiving medium, and is a highly sensitive sensor that allows its manufacture through a fewer processes, its miniaturization, resistance to aging deterioration, and production of high yields.

The invention is designed to solve at least part of the aforementioned problems and may be achieved by the following aspects.

According to a first aspect of the invention, a diaphragm for a pressure sensor includes: a central section serving as a diaphragm body, the central section including: an external surface deformed upon receipt of an external pressure; and an internal surface transmitting a force to a pressure sensitive element inside a housing of the pressure sensor; a peripheral section that is outside of the central section and welded to an outer circumference of a pressure input orifice that is provided to the housing; and a step wall provided between the central section and the peripheral section, in that: the central section and the peripheral section are integrally and concentrically provided; and the diaphragm seals the pressure input orifice.

In this case, a stress due to deformation of the diaphragm may be concentrated on a boundary between the central section and the step wall, and the welded portion and the stress concentrated portion may be positionally separated. It is therefore possible to suppress transmission of the stress to the peripheral section to be weld-attached to the housing. Accordingly, even if cracks occur to a bead at the time of welding, growth of the cracks caused by the stress may be suppressed, and aging deterioration of the diaphragm may be reduced, that is, life of the diaphragm may be extended. Also, in this structure, a residual stress generated at the peripheral section by cooling after welding may be reduced in a step area. Therefore, it is possible to suppress nonuniform deformation of the central section and to suppress deterioration of sensitivity of the diaphragm.

It is preferable that, in the diaphragm for a pressure sensor according to the first aspect, the central section serving as the diaphragm body include a wall provided concentrically to the step wall.

When the diaphragm experiences a rapid pressure change, the diaphragm vibrates. However, by providing the wall, the vibration may be reflected inside the wall and trapped in an area inside, and the growth of cracks in the bead caused by transmission of the vibration may be suppressed.

It is preferable that the diaphragm for a pressure sensor according to the first aspect further include a ring having an outer shape corresponding to an inner circumference of the step wall and set in an inner circumferential surface of the step wall so as to restrain deformation of the step wall.

In this case, the ring may suppress displacement of the step wall toward the central section. Therefore, in comparison to the first aspect, the stress due to deformation of the diaphragm may be more effectively concentrated between the step wall and the central section that is the diaphragm body. It is therefore possible to better suppress transmission of the stress to the peripheral section that is weld-attached to the housing.

It is preferable that the diaphragm for a pressure sensor according to the first aspect be made of a same material as that for the housing.

In this case, by using the same material for the diaphragm as that for the housing, it is possible to suppress the stress exerted from the housing to the diaphragm due to the temperature change and to suppress the aging deterioration of the diaphragm.

According to a second aspect of the invention, a diaphragm for a pressure sensor includes: a disk-shaped diaphragm body that bends and deforms upon receipt of an external pressure; a cylinder section that is insertable in an inner wall surface of a pressure input orifice of a sensor housing and is provided integrally to a periphery of the diaphragm body; and a step provided between a part that is weld-attached to the sensor housing provided to an end edge of the cylinder section and a peripheral section that becomes a bending point of the diaphragm body.

In this case, a stress due to bending deformation of the diaphragm may be concentrated on a boundary between the diaphragm body and the cylinder section, and this may allow positional separation between the welded portion and the stress concentrated portion. Therefore, it is possible to suppress transmission of the stress to a weld-attached part of the end edge of the cylinder section. Accordingly, even if cracks occur to the bead at the time of welding, growth of the cracks caused by the stress may be suppressed, and the aging deterioration of the diaphragm may be reduced, that is, life of the diaphragm may be extended. Also, in this structure, a residual stress generated by cooling after welding the cylinder edge may be reduced at an outer circumference of the diaphragm body. Therefore, it is possible to suppress nonuniform deformation of the diaphragm body and to suppress deterioration of the diaphragm sensitivity.

It is preferable that the diaphragm for a pressure sensor according to the second aspect further include a flange provided to the end edge of the cylinder section so that the diaphragm takes a hat shape, the flange being the part weld-attached to the housing.

In this case, the distance between the weld-attached part and a bending point of the diaphragm body may be set large. Therefore, it is possible to inhibit the stress from acting on the weld-attached part due to bending deformation of the diaphragm body, and a stronger effect in aging prevention may be produced.

It is preferable that, in the diaphragm for a pressure sensor according to the second aspect, the end edge of the cylinder section contacting an opened edge of the pressure input orifice be the part weld-attached to the sensor housing.

In this case, the stress caused by bending deformation of the diaphragm body may be prevented by the step from acting on the weld-attached part. At the same time, since the weld-attached part becomes an outer edge of the cylinder section, the heat insulating groove provided on a side adjacent to the housing at the time of welding may be set close to the cylinder section in order to let the heat escape. Accordingly, the area for installing the diaphragm may be downsized, and therefore the pressure sensor having the diaphragm may be downsized.

According to a third aspect of the invention, a pressure sensor includes the diaphragm for a pressure sensor according to the first aspect, the peripheral section of the diaphragm being welded and surrounding the outer circumference of the pressure input orifice.

In this case, a residual stress generated at the peripheral section by cooling after welding may be reduced at the step area, and nonuniform deformation of the diaphragm body of the central section may be suppressed. Accordingly, the displacement direction of a force transmitting unit to be coupled to the central section may not deviate, and loss in the transmission of force from the diaphragm to the pressure sensitive element may be prevented. Thus, sensitivity characteristics of the pressure sensor may not be negatively influenced.

It is preferable that the pressure sensor according to the third aspect further include a heat insulating groove provided close to the peripheral section.

In this case, by providing the heat insulating groove, the volume of the welded portion of the pressure input orifice may be reduced, and thus heat capacity may be reduced. Accordingly, the amount of heat for welding may be reduced, and the welding temperature may be kept low. Therefore, brittle fracture of the welded portion due to thermal deformation may be suppressed. Also, since the rate of shrinkage of the diaphragm in the cooling process after finishing welding may be decreased, the residual stress may also be reduced.

It is preferable that the pressure sensor according to the third aspect further include a countersunk part provided to an inner wall of the pressure input orifice, the countersunk part contacting the central section and a buffering section.

In this case, if the diaphragm is deformed outward, the stress is concentrated on a boundary between the central section and the step region, while, if the diaphragm is deformed inward, the stress is concentrated on a portion where the central section contacts a corner of the countersunk part. Thus, the stress may be exerted on the boundary between the central section and the step region less frequently, thereby suppressing the aging deterioration.

According to a fourth aspect of the invention, a pressure sensor includes: a housing including a pressure input orifice; a diaphragm sealing the pressure input orifice of the housing, an outer surface of the diaphragm being a pressure receiving surface; a force transmitting unit coupled to a central area of the diaphragm inside the housing and moving in a direction orthogonal to the pressure receiving surface while coordinating with the diaphragm; and a pressure sensitive section coupled to the force transmitting unit and the housing, a detecting axis of the pressure sensitive section being set along an axis orthogonal to the pressure receiving surface of the diaphragm, in that the diaphragm includes: a disk-shaped diaphragm body that bends and deforms upon receipt of an external pressure, a cylinder section that is insertable in an inner wall surface of a pressure input orifice of a sensor housing and is provided integrally to a periphery of the diaphragm body, and a step provided between a part that is weld-attached to the sensor housing provided to an end edge of the cylinder section and a peripheral section that becomes a bending point of the diaphragm body.

In this case, the diaphragm is formed as a pressure receiving medium that receives pressure of an environment which is subjected to pressure measurement, so that the pressure sensor requires no oil as a pressure receiving medium. Thus, no oil flows toward the environment subjected to the pressure measurement. Therefore, for example, the sensor is applicable to measurement of pressure of a pure liquid, which dislikes foreign substances, as the environment subjected to the pressure measurement. Also, since the oil having a large thermal expansion coefficient is not used any more, the temperature characteristics of the pressure sensor may be improved to a large extent. In particular, because the stress due to deformation of the diaphragm may be concentrated on the boundary between the diaphragm body and the cylinder section so as to allow positional separation between the welded portion and the stress concentrated portion, it is possible to suppress transmission of the stress to the weld-attached part of the end edge of the cylinder section. Accordingly, even if cracks occur to the bead at the time of welding, growth of the cracks caused by the stress may be suppressed, and the aging deterioration of the diaphragm may be reduced, that is, life of the diaphragm may be extended. Moreover, in this structure, the residual stress generated by cooling after welding the cylinder edge may be reduced at the outer circumference of the diaphragm. Therefore, it is possible to suppress nonuniform deformation of the diaphragm body and to suppress deterioration of the diaphragm sensitivity.

It is preferable that, in the pressure sensor according to the third aspect, the end edge of the cylinder section contacting an opened edge of the pressure input orifice be the part weld-attached to the sensor housing.

In this case, the stress caused by bending deformation of the diaphragm body may be prevented by the step from acting on the weld-attached part. At the same time, since the weld-attached part becomes the outer circumference of the cylinder section, the heat insulating groove provided on a side adjacent to the housing may be set close to the cylinder section in order to let the heat escape at the time of welding. Accordingly, an area for installing the diaphragm may be downsized, and, therefore, the pressure sensor having the diaphragm may be downsized.

According to a fifth aspect of the invention, a pressure sensor includes: a housing; a pair of pressure input orifices coaxially provided to end face plates of the housing, the end face plates facing each other; first and second diaphragms sealing the pressure input orifices, outer surfaces of the diaphragms being pressure receiving surfaces; a force transmitting unit coupling together central areas of internal surfaces of the diaphragms inside the housing; and a pressure sensitive element of which first end being coupled to an intermediate part of the force transmitting unit and of which second end being coupled to the housing, a detecting axis of the element being arranged parallel to an axis orthogonal to the pressure receiving surfaces of the diaphragms, in that: each diaphragm includes: a disk-shaped diaphragm body that bends and deforms upon receipt of an external pressure, a cylinder section that is insertable in an inner wall surface of a pressure input orifice of a sensor housing and is provided integrally to a periphery of the diaphragm body, and a step provided between a part that is weld-attached to the sensor housing provided to an end edge of the cylinder section and a peripheral section that becomes a bending point of the diaphragm body; and in that the end edge of the cylinder section in contact with an opened edge of the pressure input orifice is the part weld-attached to the sensor housing.

In this case, the pressure sensor that needs no oil and is miniaturized may be used as a relative pressure sensor. Also, because the stress due to bending deformation of the diaphragm may be concentrated on the boundary between the diaphragm body and the cylinder section, the welded portion and the stress concentrated portion may be positionally separated. Therefore, it is possible to suppress transmission of the stress to the weld-attached part of the end edge of the cylinder section. Accordingly, even if cracks occur to the bead at the time of welding, growth of the cracks caused by the stress may be suppressed, and the aging deterioration of the diaphragm may be reduced, that is, life of the diaphragm may be extended.

According to a sixth aspect of the invention, a pressure sensor includes: a housing; a pressure input orifice provided to an end face plate of the housing; a diaphragm sealing the pressure input orifice, an outer surface of the diaphragm being a pressure receiving surface; a force transmitting unit arranged at a central area of an internal surface of the diaphragm inside the housing at an axis orthogonal to the pressure receiving surface of the diaphragm; and a pressure sensitive element of which first end being coupled to an intermediate part of the force transmitting unit and of which second end being coupled to the housing, a detecting axis of the element being set coaxially with an axis orthogonal to the pressure receiving surface of the diaphragm, in that: the diaphragm includes: a disk-shaped diaphragm body that bends and deforms upon receipt of an external pressure, a cylinder section that is insertable in an inner wall surface of a pressure input orifice of a sensor housing and is provided integrally to a periphery of the diaphragm body, and a step provided between a part that is weld-attached to the sensor housing provided to an end edge of the cylinder section and a peripheral section that becomes a bending point of the diaphragm body; and in that the end edge of the cylinder section in contact with an opened edge of the pressure input orifice is the part weld-attached to the sensor housing.

In this case, the pressure sensor that needs no oil and is miniaturized may be used as an absolute pressure sensor. Also, because the stress due to bending deformation of the diaphragm may be concentrated on the boundary between the diaphragm body and the cylinder section, the welded portion and the stress concentrated portion may be positionally separated. Therefore, it is possible to suppress transmission of the stress to the weld-attached part of the end edge of the cylinder section. Accordingly, even if cracks occur to the bead at the time of welding, growth of the cracks caused by the stress may be suppressed, and the aging deterioration of the diaphragm may be reduced, that is, life of the diaphragm may be extended.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the present invention will now be described in detail using the drawings showing embodiments of a diaphragm for a pressure sensor according to the invention and a pressure sensor including the diaphragm. Note that the components described in the embodiments, as well as their types, combinations, configurations, and relative locations, are merely examples for the purpose of explanation and do not limit the claims of the invention unless otherwise specified.

Figure 1A:
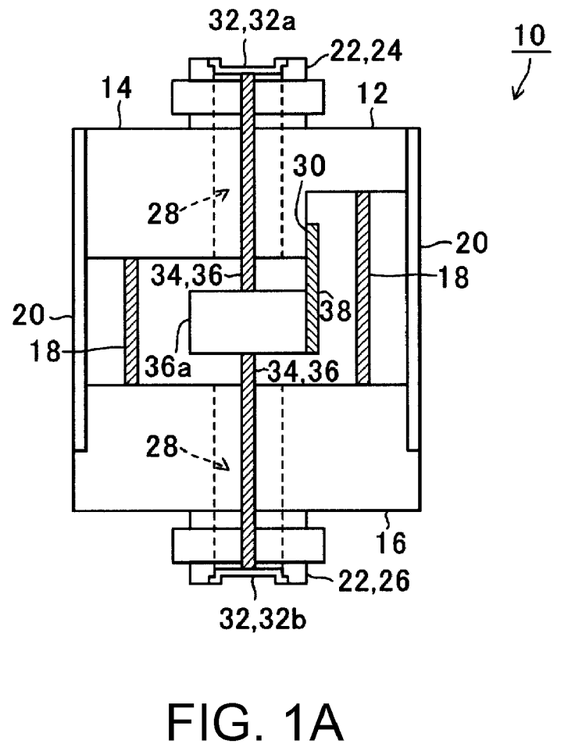
FIG. 1A is a sectional pattern diagram of a pressure sensor using a diaphragm according to a first embodiment.
Figure 1B:
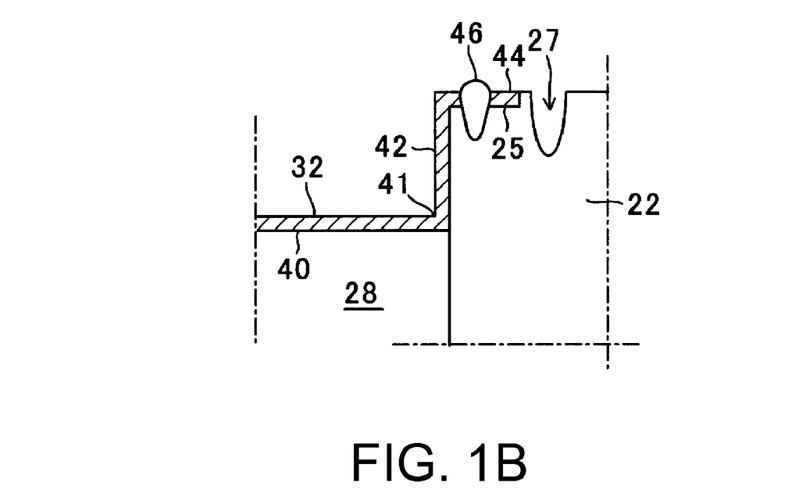
FIG. 1B is an enlarged sectional view of an essential part of FIG. 1A.
Figure 2A:
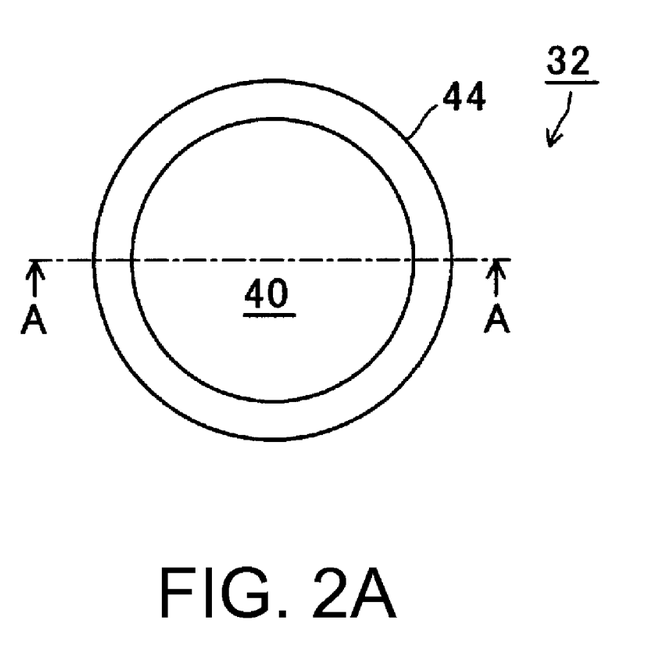
FIG. 2A is a plan view of the diaphragm for the pressure sensor according to the first embodiment.
Figure 2B:
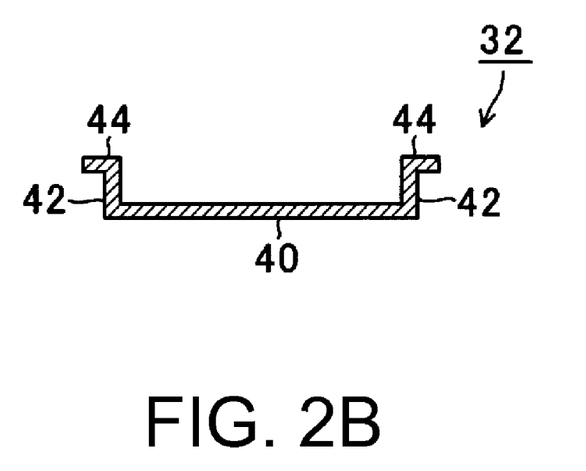
FIG. 2B is a sectional view of the diaphragm of FIG. 2A.

FIGS. 1A and 1B illustrate a first embodiment of the pressure sensor according to the invention. FIG. 1A is a sectional pattern diagram schematically showing the pressure sensor. FIG. 1B is a detailed view of a part of FIG. 1A, showing a welding portion of the diaphragm. A pressure sensor 10 according to the first embodiment has a cylindrical outer shape and includes: a housing 12, diaphragms 32, a shaft 36 which is a force transmitting unit 34, and a pressure sensitive element 38.

The housing 12 is vacuumed and sealed and houses components as described hereafter. The pressure sensor 10 is thus capable of increasing a Q value of the pressure sensitive element 38, securing a stable resonance frequency, and therefore securing long-term stability.

The whole outer shape of the housing 12 is made up of: a disk-shaped first member 14 constituting an upper end face plate of the housing 12, a disk-shaped second member 16 constituting a lower end face plate of the housing 12, supporting poles 18 joining the first member 14 to the second member 16, and a third member 20 serving as a cylinder sidewall which covers side surfaces of the first and second members 14, 16. The first and second members 14, 16 have an identical diameter. The first and second members 14, 16 have pipe sleeves 22 in such positions as to constitute a concentric circle. The pipe sleeves 22 protrude outside so as to open a first pressure input orifice 24 and a second pressure input orifice 26. Provided at a central position of the concentric circle is a through hole 28 with which the first member 14 communicates with the first pressure input orifice 24 (the second member 16 with the second pressure input orifice 26).

The supporting poles 18 have a certain degree of rigidity and are provided at positions where the first and second members 14, 16 face each other. Each supporting pole 18 is inserted in a dowel hole (not shown) having a shape corresponding to a sectional outer shape of the supporting pole 18, thereby securing rigidity among the first member 14, the second member 16, and the supporting poles 18. The supporting poles 18 reduce unwanted deformation imparted against the pressure sensitive element 38, which will be described hereafter, when assembling the pressure sensor 10 and when using a product. Although two supporting poles 18 are illustrated in the drawing, one or more than two supporting poles may be used.

In order to reduce errors of the pressure sensor 10 caused by thermal expansion, a material for the housing 12 is preferably metal or ceramic having a small thermal expansion coefficient, particularly at an area surrounding a portion that houses the supporting poles 18 and the pressure sensitive element 38.

The diaphragms 32 (a first diaphragm 32a and a second diaphragm 32b) are installed in the first and second pressure input orifices 24 and 26, respectively. The diaphragms 32 bend in accordance with pressure of a gas or a liquid to be measured, seal the through hole 28, and are exposed to outside.

Each of the diaphragms 32 (the first and second diaphragms 32a, 32b) includes: a central section (a diaphragm body) 40, a cylindrical buffering section (a cylinder section) 42 provided to an outer edge of the central section (the diaphragm body) 40, and a peripheral section (a flange) 44 provided at an outer edge of a tip of the buffering section (cylinder section) 42, all of which are concentrically arranged in this order from the interior. Each diaphragm 32 has a shape of a hat-like ashtray as a whole. One surface of the disk-shaped central section (the diaphragm body) 40 is a pressure receiving surface that faces outside. The pressure receiving surface is bent and deformed upon receipt of an external pressure that is a pressure to be measured. A force is applied to end surfaces of the shaft 36 that is the force transmitting unit 34 as described hereafter. The end surfaces of the force transmitting unit 34 comes in contact with the other surface of the central section (the diaphragm body) 40 of the diaphragm 32. The peripheral section (the flange) 44 in a ring shape is a section that is welded to an outer circumference of each pipe sleeve 22 of the housing 12 by e.g. laser welding. The cylindrical buffering section (the cylinder section) 42 is orthogonally coupled to an outer circumference of the central section (the diaphragm body) 40 and to an inner circumference of the peripheral section (the flange) 44, thereby forming a step between the outer circumference of the central section (the diaphragm body) 40 and the peripheral section (the flange) 44, and thereby separating them from each other. A step wall (the buffering section 42) is thus provided between the central section (the diaphragm body) 40 and the peripheral section (the flange) 44. At the same time, a peripheral countersunk part 25 having a configuration corresponding to the outer shape of the peripheral section (the flange) 44 is provided to each pipe sleeve 22 of the housing 12 so as to set therein the peripheral section (the flange) 44. The peripheral section (the flange) 44 set in the peripheral countersunk part 25 is welded and coupled to the peripheral countersunk part 25, thereby producing a ring-like bead 46. Additionally, a heat insulating groove 27 is concentrically carved nearby (at an outer circumference of) the peripheral countersunk part 25.

The housing 12 and the diaphragms 32 may be made of a corrosion resistant material such as metal like stainless steel, or ceramic, or may be made of a single crystalline body such as quartz crystal or of other amorphous body. In either case, it is preferable that they be made of the same material. By using the same material for the diaphragms and the housing, it becomes possible to suppress a stress imparted to the diaphragms from the housing due to temperature changes and to suppress the aging deterioration of the diaphragms.

The diaphragms 32 may be provided by a pressing process, or by photolithography and etching (hereunder, together referred to as photolitho-etching) which does not produce a residual stress and is advantageous for miniaturization. In particular, if the central section (the diaphragm body) and the peripheral section (the flange) have the same thickness, one etching process is enough to produce the diaphragms. The surfaces of the diaphragms 32 exposed to outside may be coated so as not to be corroded by the liquid, gas, and the like. For example, if the diaphragms are made of metal, a nickel compound may be used for the coating.

The shaft 36 as the force transmitting unit 34 is inserted through the through hole 28 and installed between the first and second diaphragms 32a and 32b. Each end of the shaft 36 is in contact (coupled) orthogonally with the surface of a central area of the central section (the diaphragm body) 40 of the first and second diaphragms 32a and 32b. Thus, even if a pressure is applied to the diaphragms 32, the shaft 36 and the first and second diaphragms 32a, 32b are displaced in the same direction. In this case, the diaphragm 32 on one side receiving a higher pressure is displaced toward the inside of the housing 12, and the diaphragm 32 on the other side receiving a lower pressure is displaced toward the outside of the housing 12. However, since the length of the shaft 36 does not change, the absolute value of the displacement is consistent at both sides. Additionally, a movable member 36a, also having the same displacement direction as that of the shaft 36, is fixed at a predetermined position of the shaft 36.

An example material for the shaft 36 is stainless steel having a stable strength, aluminum, or ceramic which is easy to process, depending on usage of the pressure sensor. Using such a material, a stable and high-precision pressure sensor may be composed. If the material for the shaft 36 is ceramic having a small thermal expansion coefficient, in particular, the temperature characteristics of the pressure sensor comply much with those of the pressure sensitive element 38. Additionally, it is desirable that the both ends of the shaft 36 be circular and coupled to the diaphragms 32 in a manner that the shaft 36 and the central section (the diaphragm body) 40 of the diaphragms 32 form a concentric circle.

The pressure sensitive element 38 of the embodiment is made of a piezoelectric material such as quartz crystal, lithium niobate, and lithium tantalite, and is formed as elements such as a double-ended tuning fork resonator element, a surface acoustic wave (SAW) resonator, and a thickness shear resonator. The pressure sensitive element 38 is coupled at its both ends with the movable member 36a and a fixing member 30 of the first member 14, and is supported by these members. In this pressure sensitive element 38, a force detecting direction is set as a detecting axis. A direction in which the both ends of the pressure sensitive element 38 are joined is in parallel to the detecting axis. The pressure sensitive element 38 is electrically coupled with an oscillation circuit (not shown) mounted to the housing 12, and oscillates at a specific resonance frequency by an alternating voltage supplied from the oscillation circuit. When the pressure sensitive element 38 receives a tensile (stretching) force or a compressive force from the movable member 36a, the resonance frequency changes. For the double-ended tuning fork resonator, in particular, it is suitable to use a pressure sensor having excellent resolution abilities such as an ability to detect a slight pressure difference. This is because, when compared to the other resonators such as a thickness shear resonator, the change in the resonance frequency in the double-ended tuning fork resonator by the tensile and compressive stress is outstandingly larger, and the resonance frequency has a larger variable width. In the double-ended tuning fork resonator, the resonance frequency increases upon receipt of a tensile stress because the amplitude of an oscillating arm (a vibration unit) decreases, while the resonance frequency decreases upon receipt of a compressive stress because the amplitude of the oscillating arm (the vibration unit) increases. A preferred material for a piezoelectric substrate of the double-ended tuning fork resonator is quartz crystal that has excellent temperature characteristics.

The diaphragms 32 (a shaded portion in FIG. 1B) having the described structure are pressed into the pipe sleeves 22. Therefore, the compressive stress is produced 22 in the central section (the diaphragm body) 40 and the buffering section (the cylinder section) 42 by the inner walls of the pipe sleeves. Since the compressive stress is to be concentrically and uniformly distributed in the central section (the diaphragm body) 40 that is the pressure receiving part of the diaphragms 32, the compressive stress does not negatively influence bending sensitivity of the diaphragms. Therefore, even though the stress is concentrated at a boundary 41 between the central section (the diaphragm body) 40 and the buffering section (the cylinder section) 42 due to deformation of the diaphragms, it is possible to suppress transmission of the concentrated stress to the peripheral section (the flange) 44 since the welded portion (the peripheral section (the flange) 44) and this stress-concentrated portion positionally separated from each other. Accordingly, even if cracks occurred to the bead 46 at the time of welding, it is possible to suppress the growth of cracks caused by the stress. Therefore, the aging deterioration of the diaphragms 32 is reduced, and life of the diaphragms 32 is thereby extended. Moreover, since the residual stress generated when welding the peripheral section (the flange) 44 by laser irradiation is reduced at the buffering section (the cylinder section) 42 that is the step area and not concentrated at the central section (the diaphragm body) 40 that is the pressure receiving part of each diaphragm, the nonuniform deformation of the central section (the diaphragm body) 40 is prevented.

As a consequence, in the pressure sensor 10 of FIG. 1A as proposed by the present inventor, also, the shaft 36 does not tilt to deviate in its displacement direction caused by the nonuniform deformation of the diaphragms 32. Also, because the shaft 36 is securely displaced in the direction of the force-detecting axis, any loss in the force transmission from the diaphragms 32 to the pressure sensitive element 38 caused by deviation of the displacement direction is prevented, and the sensitivity characteristics of the pressure sensor 10 are not negatively influenced.

In addition, because the heat insulating groove 27 is provided, the volume of the welded portion of the pipe sleeves 22 is reduced, and thus heat capacity is reduced. The amount of heat for welding is therefore reduced, and the welding temperature can be kept low. Therefore, brittle fracture of the welded portion due to the thermal deformation is suppressed. Furthermore, because shrinkage of the diaphragms in the cooling process after stopping welding is reduced, the residual stress is also reduced.

Figure 3A:
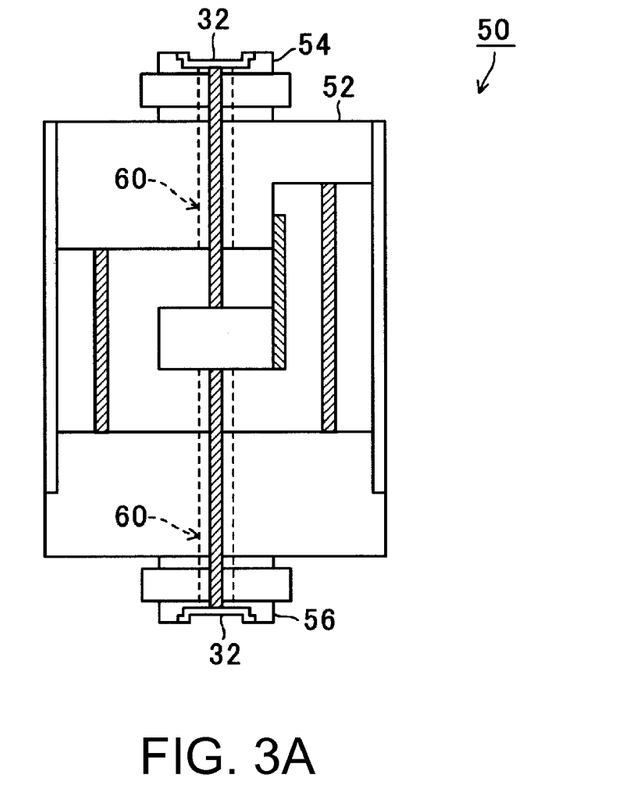
FIG. 3A is a sectional view of a diaphragm for a pressure sensor according to a second embodiment.
Figure 3B:
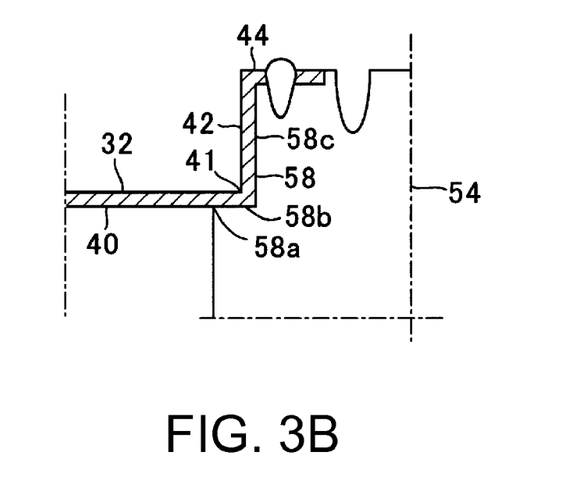
FIG. 3B is an enlarged sectional pattern diagram of a portion for installing the pressure sensor of FIG. 3A.

FIGS. 3A and 3B illustrate diaphragms for a pressure sensor according to a second embodiment and the pressure sensor including these diaphragms. FIG. 3A is a schematic view of the pressure sensor. FIG. 3B is an enlarged partial view of FIG. 3A, showing in detail the welding portion of one of the diaphragms. The diaphragms 32 according to the second embodiment are the same as those of the first embodiment. However, although basically similar to the pressure sensor 10 of the first embodiment, a pressure sensor 50 according to the second embodiment includes a countersunk part 58 which is provided to an opened end of an inner wall of both a first pressure input orifice 54 and a second pressure input orifice 56. A through hole 60 therefore has a larger internal diameter near the opened ends. Each of the diaphragms 32 comes in contact with the countersunk part 58. Specifically, an outer circumferential part of the central section (the diaphragm body) 40 comes in contact with a ring-shaped end surface 58b of the countersunk part 58, and an outer circumferential part of the buffering section (the cylinder section) 42 comes in contact with a side surface 58c of the countersunk part 58.

Consequently, if the diaphragms 32 are deformed toward the outside of the housing 52, the stress is concentrated on the boundary 41 between the central section (the diaphragm body) 40 and the buffering section (the cylinder section) 42, while, if the diaphragms 32 are deformed toward the inside of the housing 52, the stress is concentrated on the portion where the central section (the diaphragm body) 40 comes in contact with a corner 58a of the countersunk part 58. Accordingly, it is possible to reduce the frequency of exertion of stress on the boundary 41 between the central section (the diaphragm body) 40 and the buffering section (the cylinder section) 42, and to suppress the aging deterioration.

Figure 4A:
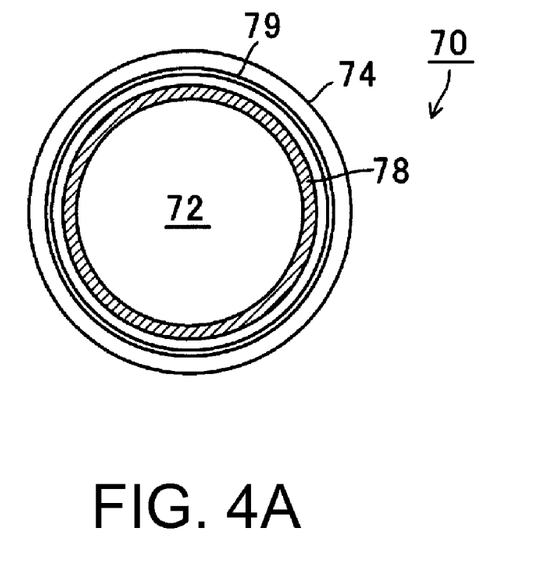
FIG. 4A is a plan view of a diaphragm according to a third embodiment.
Figure 4B:
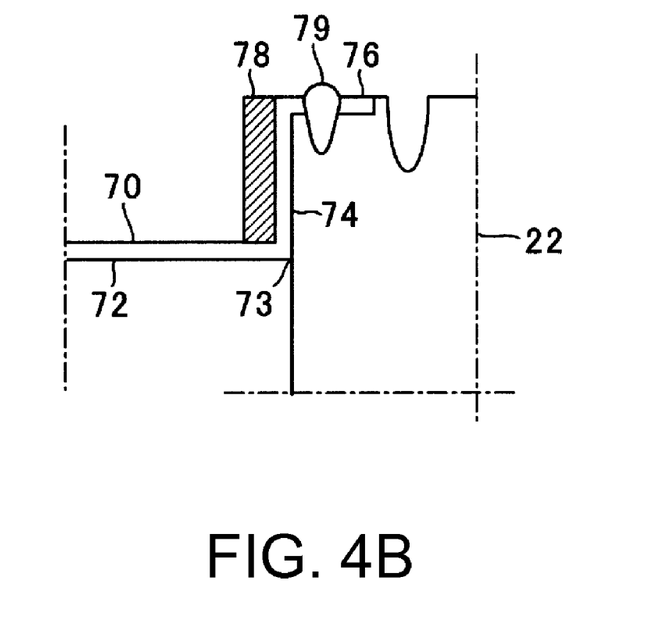
FIG. 4B is an enlarged sectional view of an essential part of FIG. 4A, showing a portion for mounting a housing.

FIGS. 4A and 4B illustrate a diaphragm according to a third embodiment. FIG. 4A is a plan view of the diaphragm at the time of welding, and FIG. 4B is a detailed view of FIG. 4A at the time of welding. The configuration of a diaphragm 70 according to the third embodiment is the same as that of the diaphragm 32 according to the first embodiment. Set in the diaphragm 70, however, is a ring 78 (a shaded portion in FIGS. 4A and 4B) having an outer shape corresponding to an inner circumference of a buffering section (a cylinder section) 74 that is a step wall. The ring 78 makes it possible to restrain deformation of the buffering section (the cylinder section) 74. The ring 78 is set in after welding the diaphragm 70 to the pipe sleeves 22 while at the same time forming a bead 79. Consequently, the ring 78 inhibits the buffering section (the cylinder section) 74 from displacing toward a central section 72. Therefore, compared to the first and second embodiments, the stress caused by the deformation generated upon receipt of pressure by the diaphragm 70 is more efficiently concentrated on a boundary 73 between the central section 72 and the buffering section 74, and the stress is thus further inhibited from being transmitted to a peripheral section 76. In addition, for the same reasons as previously mentioned, it is preferable that a material used for this ring 78 be also the same as that for the diaphragm 70 and the housing.

Figure 5A:
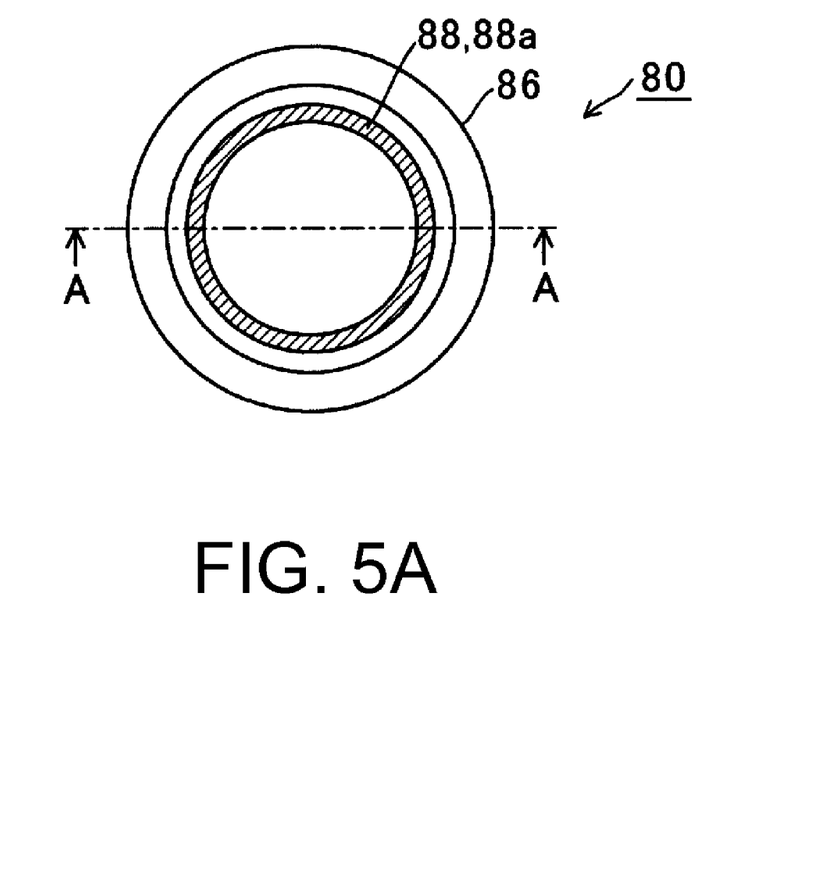
FIG. 5A is a plan view of a diaphragm according to a fourth embodiment.
Figure 5B:
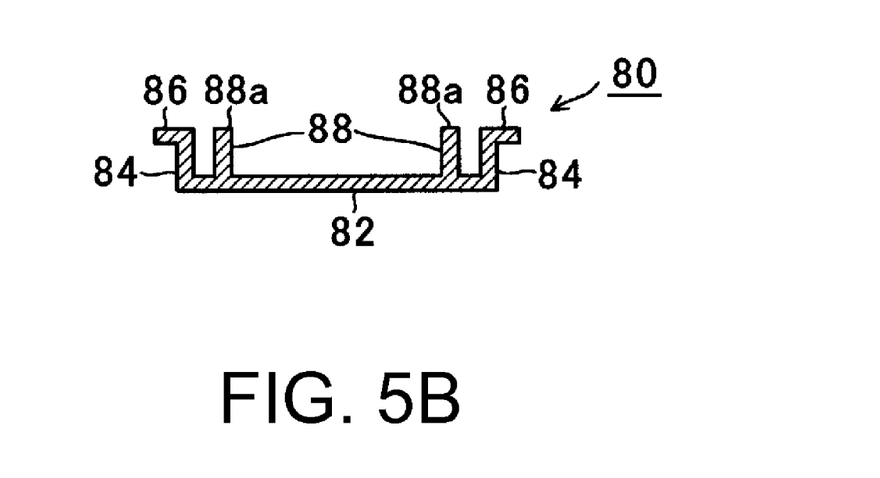
FIG. 5B is a sectional view of the diaphragm of FIG. 5A.

FIGS. 5A and 5B illustrate a diaphragm 80 according to a fourth embodiment. FIG. 5A is a plan view, and FIG. 5B is a sectional view of FIG. 5B taken on a line A-A. The diaphragm 80 according to the fourth embodiment is similar to the diaphragm of the first embodiment, except that a wall 88 (a shaded portion in FIG. 5A) is provided concentrically to a central section (a diaphragm body) 82. There is a gap provided between an outer circumference of the wall 88 and a buffering section (a cylinder section) 84. If an opened end 88a of the wall 88 and a peripheral section (a flange) 86 are to be provided coplanarly, the diaphragm 80 may be made by a single etching step using the photolitho-etching process.

When there is a sudden pressure change occurred to the diaphragm, the diaphragm vibrates. However, by providing the wall 88, the vibration is reflected by the wall 88 on the inside and blocked within a region inside the wall 88 of the central section (the diaphragm body) 82. As a consequence, growth of cracks in the bead caused by transmission of the vibration is suppressed.

The diaphragms of the third and fourth embodiments do not interfere with the pressure sensors of the first and second embodiments in any way, and are therefore applicable to the first and second embodiments. In application of the third embodiment to the second embodiment, it is necessary that the ring 78 be installed while at the same time forming a gap between the ring 78 and the central section 72 so as to avoid contact with the central section 72. Also, in application of the fourth embodiment to the third embodiment, the ring 78 may be designed such that the thickness thereof is equal to or less than the width of the gap between the outer circumference of the wall 88 and the inner circumference of the buffering section 84.

Figure 6:
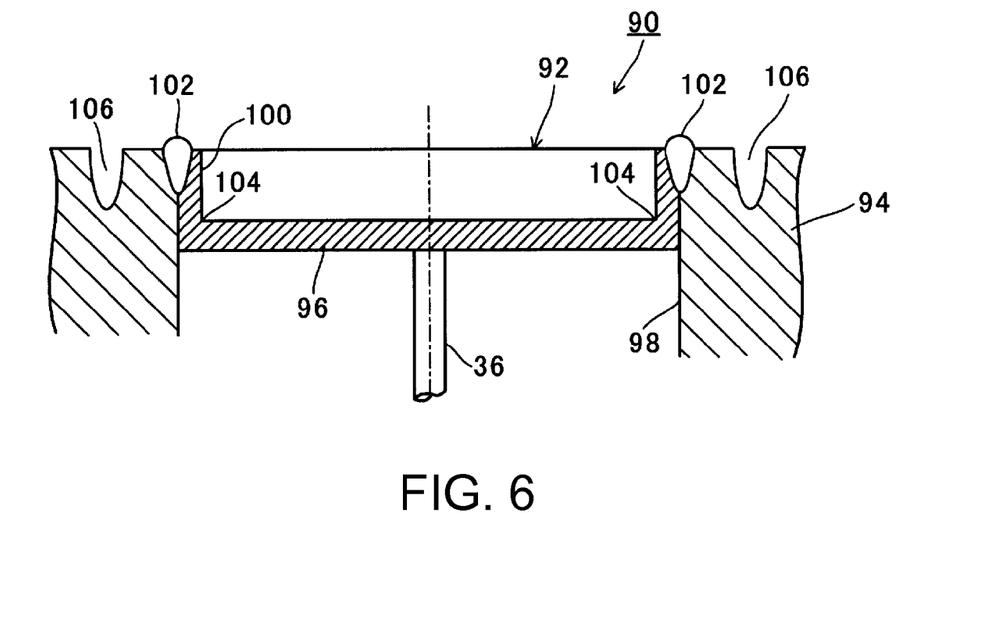
FIG. 6 is a sectional view of a detailed essential part of a pressure sensor according to a fifth embodiment.

FIG. 6 illustrates a fifth embodiment. This diagram shows a sectional view of a pressure sensor 90 according to the fifth embodiment in a state that a diaphragm 92 is installed in a housing 94 of the pressure sensor. The diaphragm 92 includes: a disk-shaped diaphragm body (a central section) 96 that bends and deforms upon receipt of an external pressure, and a cylinder section (a buffering section) 100 that is insertable in an inner wall surface of a pressure input orifice 98 of the sensor housing 94 which is provided integrally to a periphery of the diaphragm body (the central section) 96. Also, a step wall is provided between a weld-attached part (a bead) 102 and an outer periphery 104. The weld-attached part 102 is weld-attached to the sensor housing 94 provided to an end edge of the cylinder section (the buffering section) 100, and the outer periphery 104 becomes a bending point of the diaphragm body 96. In particular, in this embodiment, the weld-attached part (the bead) 102 becomes the cylinder section's end edge that contacts an opened edge part of the pressure input orifice 98 of the sensor housing 94, and is weld-attached to an opened edge of the sensor housing 94. In other words, the diaphragm 92 according to the present embodiment is a cylindrical container-like diaphragm without the flange which was explained as the peripheral section of the diaphragms in the first to fourth embodiments, and is such that the cylinder section (the buffering section) 100 is inserted in the inner wall surface of the pressure input orifice 98 and welded at the opened end of the pressure input orifice 98. Such a composition allows downsizing of radius of a heat insulating groove 106 which is provided to surround the outer circumference of the welded part (the bead) 102 in order to avoid the thermal influence at the time of welding and, therefore, allows miniaturization of the pressure sensor.

Figure 7:
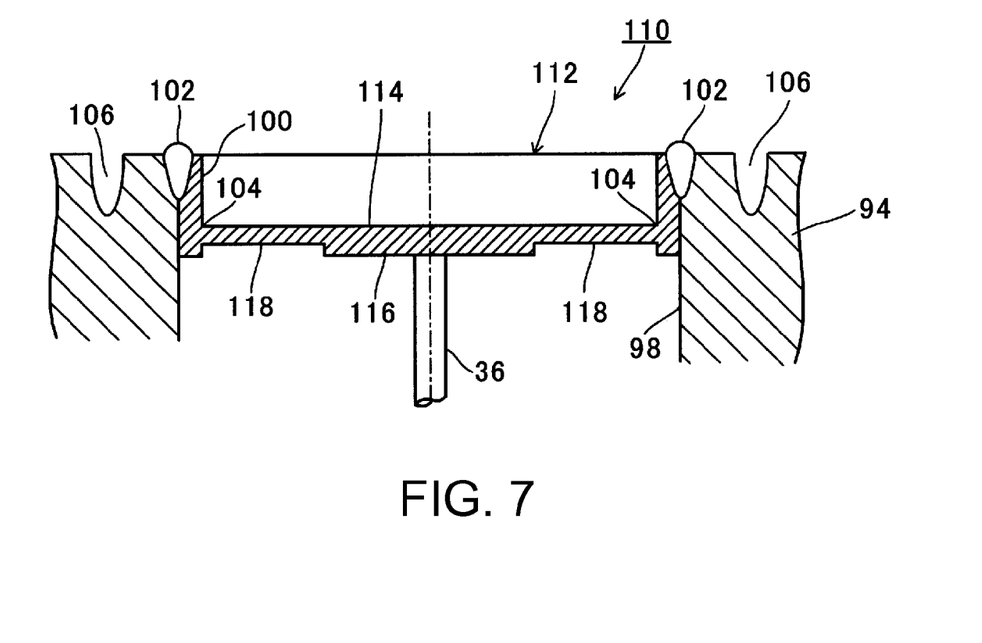
FIG. 7 is a sectional view of a detailed essential part of a pressure sensor according to a sixth embodiment.

FIG. 7 illustrates a sixth embodiment. The only difference from the pressure sensor 90 of the fifth embodiment of FIG. 6 is the structure of the diaphragm body, in that a diaphragm body 114 of a diaphragm 112 in this embodiment includes a pressure receiving surface. Specifically, the diaphragm body 114 is provided using a flat plate plane. The diaphragm body 114 is coupled to the shaft 36 which is the force transmitting member that transmits, to the pressure sensitive member, bending deformation caused when the pressure sensor 110 receives a pressure. Then, a circular groove 118 is provided around a central area 116 of the diaphragm body 114 to which the shaft 36 is coupled. The central area therefore becomes relatively thick. Other compositions are the same as those of the fifth embodiment, and thus the same members are allotted the same reference numbers, and descriptions thereof will not be repeated.

According to this embodiment, in addition to the effects of the pressure sensor of the fifth embodiment described above, the following effects are produced. Specifically, when stress is applied, the stress is concentrated on the step part between the thick portion and a thin portion of the diaphragm body 114. The thick central area 116 is displaced up and down upon receipt of the stress, but since curving deformation of the central area 116 is small, the stress is not concentrated on a portion where the center shaft 36 is joined to the diaphragm 112. Consequently, the center shaft 36 is not affected by an unwanted force in a direction different from the force in the axis direction, and, therefore, pressure detection accuracy is improved.

Figure 8:
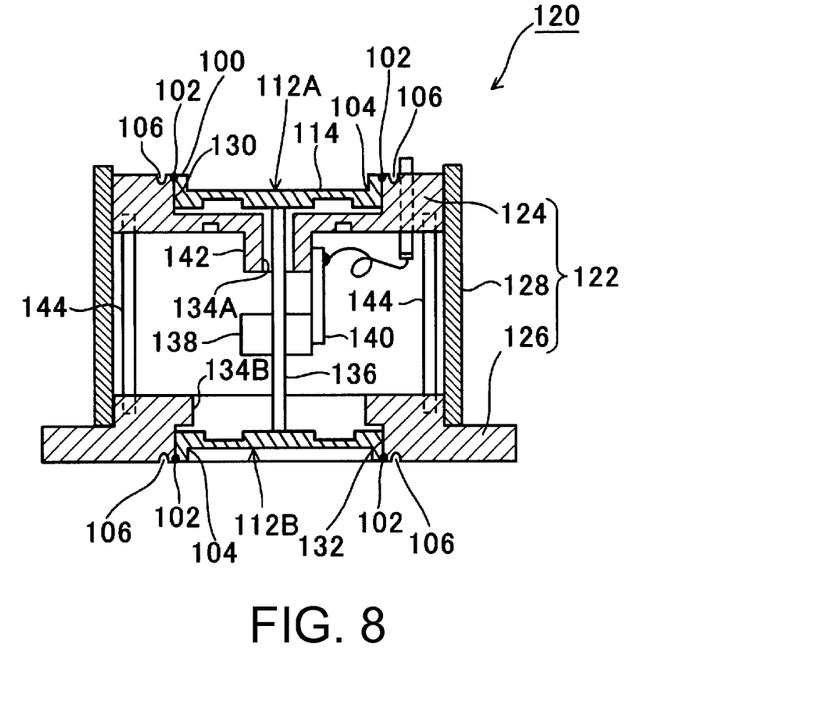
FIG. 8 is a schematic sectional view of a pressure sensor according to a seventh embodiment.

FIG. 8 illustrates a pressure sensor 120 for relative pressure detection according to a seventh embodiment. The pressure sensor 120 uses the diaphragm 112 shown in FIG. 7.

The pressure sensor 120 includes a housing 122 composed of a hollow cylindrical chassis. The housing 122 includes: a hermetic terminal board 124 as a first member (an upper end face plate), a flange end face plate 126 as a second member (a lower end face plate), and a cylinder sidewall 128 as a third member which surrounds the circumference of the end face plates separately disposed, so that the housing 122 has a structure of a hollow airtight container. On each outer surface of the hermetic terminal board 124 and the flange end face plate 126, a first pressure input orifice 130 and a second pressure input orifice 132 communicating with an internal space of the housing are provided as recesses. Through holes 134 (134, 134B) having the same axis as an axis core of the housing 122 are made through bottom plates of the hermetic terminal board 124 and the flange end face plate 126, respectively, thereby allowing communication between the inside and the outside. In the recesses of the pressure input orifices 130, 132, a first diaphragm 112A and a second diaphragm 112B are inserted, respectively. The circumferences of the first and second diaphragms 112A and 112B are integrally welded and joined to the hermetic terminal board 124 and the flange end face plate 126, respectively, so as to shield the housing. The first diaphragm 112A on a side adjacent to the hermetic terminal board 124 is for setting atmospheric pressure, and the second diaphragm 112B on a side adjacent to the flange end face plate 126 is for receiving pressure. As is the case with the other embodiments, the housing 122 also is shielded, and the internal space is kept vacuumed by an air vent that is not illustrated.

Each of the diaphragms 112 (112A, 112B) has the structure as illustrated in FIG. 7, and includes: the disk-shaped diaphragm body (the central section) 114 that bends and deforms upon receipt of an external pressure, and the cylinder section (the buffering section) 100 that is insertable in the inner wall surface of both the pressure input orifices 130 and 132 of the sensor housing 122 that is provided integrally to the periphery of the diaphragm body (the central section) 114. The end edge of the cylinder section (the buffering section) 100 is joined to the opened edges of the pressure input orifices 130, 132 with the weld-attached part 102 (weld bead). The heat-insulating groove 106 is provided surrounding the circumference of the weld-attached part 102. As a consequence, the step wall is provided between the weld-attached part (weld bead) 102, which is weld-attached to the sensor housing 122, and the outer periphery 104 which becomes the bending point of the diaphragm body 114. In particular, in this embodiment, a shaft 136 as the force transmitting unit is coupled to the central area of the diaphragm body 114. The circular groove 118 is provided around the central area 116, thereby thickening the central area 116.

Inside the housing 122, the shaft (the force transmitting unit) 136 is disposed along the core axis of the housing 122 and passing through the through hole 134. The shaft 136 bonds and connects the central areas on the inner surfaces of the first and second diaphragms 112A and 112B to each other. At an intermediate part of the shaft 136, a movable portion 138 serving as a pressure sensitive element pedestal is provided in an integral manner. Attached to the movable portion 138 is one end of a pressure sensitive element 140 composed of a double-ended tuning fork resonator. A detecting axis is set parallel to an axis orthogonal to pressure receiving surfaces of the first and second diaphragms 112 (112A, 112B). The other end of the pressure sensitive element 140 is coupled to a boss part 142 serving as a pressure sensitive element pedestal that is protruding inside and provided to the hermetic terminal board 124 of the housing 122. As a consequence, the shaft 136 moves in the axis direction due to the pressure difference between the first diaphragm 112A for receiving pressure and the second diaphragm 112B for atmospheric pressure, thereby moving the position of the movable portion 138. This moving force generates a force for operating the pressure sensitive element 140 in the detecting axis direction.

Inside the housing 122, a plurality of supporting poles 144 is disposed in parallel with the shaft 136 while surrounding the shaft 136. The supporting poles 144 provide a constant distance between the flange end face plate 126 that is the second member and the hermetic terminal board 124 that is the first member, so that the detection accuracy is not degraded by deformation of the housing 122 caused by external force or an arbitrary posture of the housing 122.

According to the above-described seventh embodiment, the center shaft 136 connects the pair of diaphragms 112 with each other. Also, the movable portion 138 provided at the intermediate part of the center shaft 136 moves integrally in a shaft axis direction in accordance with behaviors of the diaphragms 112 (this movement is caused by the pressure difference between the pair of the diaphragms 112A and 112B). The movement of the movable portion 138 corresponds to the operation force of the pressure sensitive element 140, which is the double-ended tuning fork resonator, in the detecting axis direction. Therefore, it is possible to compose a pressure sensor that does not use oil but has high detection accuracy and that is miniaturized and easily assembled. Moreover, the housing 122 as the vacuumed container is composed of the flange end face plate 126, the hermetic terminal board 124, and the cylinder sidewall 128. Since the hermetic terminal board 124 and the first diaphragm 112A are formed integrally, and the flange end face plate 126 and the second diaphragm 112B are formed integrally, the assembly can be carried out simply and easily. When mounting the pressure sensor 120 to a container for sinking (immersing) a liquid to be measured, the flange end face plate 126 is surface-bonded and bolted to the container for the measuring liquid via an o ring that is disposed surrounding the periphery of the second diaphragm 112B.

In particular, in the seventh embodiment, the central area 116 (see FIG. 7) of the pair of diaphragms 112 coupled to the shaft 136 is made thicker than the thickness of the periphery of the diaphragms 112. In this structure, when stress is applied, the stress is concentrated on the step part between the thin portion and the thick portion of the diaphragm body 114. The thick central area 116 is displaced up and down upon receipt of the stress, but since curving deformation of the central area 116 is small, the stress is not concentrated on the portion where the center shaft 136 is joined to the diaphragm 112. Consequently, the center shaft 136 is not affected by an unwanted force in a direction different from the axis-direction force, and, therefore, pressure detection accuracy is improved.

Also, in the seventh embodiment, the diaphragms 112 are inserted and attached to the pressure input orifices 130, 132 that are provided as recesses on the outer surface of the hermetic terminal board 124 and the flange end face plate 126. Therefore, the portions protruding outside are omitted in this housing 122. Thus, the housing 122 is smaller in height, thereby enhancing further miniaturization.

Additionally, in this embodiment, when mounting the diaphragms 112 to the housing 122, a tip edge of the cylinder section 100 is weld-attached at the opened edges of the pressure input orifices 130, 132. Accordingly, the position for forming the heat insulating groove 106 can be set close to the center of the housing. Therefore, the housing 122 can be made shorter than those in the other embodiments by the size of the diaphragm flange, thereby greatly contributing to further miniaturization.

Figure 9:
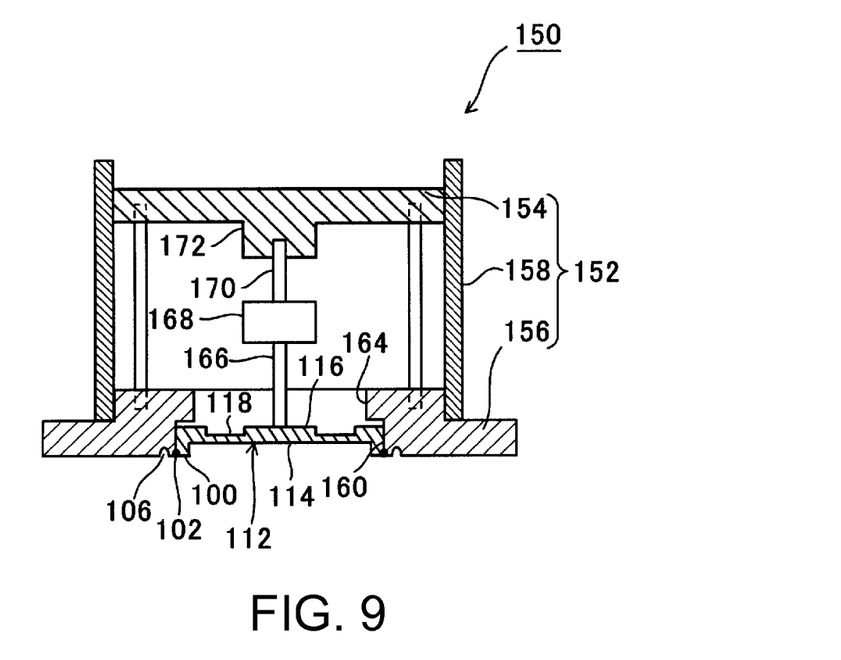
FIG. 9 is a schematic sectional view of a pressure sensor according to an eighth embodiment.

FIG. 9 is a sectional view of a pressure sensor 160 according to an eighth embodiment. The example shown in the drawing is an example of a pressure sensor for detecting absolute pressure using the diaphragm 112 shown in FIG. 7.

The pressure sensor 160 includes a housing 152 composed of a hollow cylindrical chassis. The housing 152 includes: a hermetic terminal board 154 as a first member (an upper end face plate), a flange end face plate 156 as a second member (a lower end face plate) that is the same as that in the seventh embodiment, and a cylinder sidewall 158 as a third member surrounding the circumference of the end face plates that are separately disposed by the cylinder sidewall 158, so that the housing 152 has a structure of a hollow sealed container. In the flange end face plate 156, a pressure input orifice 160 communicating with the inner space is penetrated coaxially with an axis core of the housing 152, thereby forming a recess. Provided in the center of the recess is a through hole 164. The diaphragm 112 is inserted in the recess, and the housing 152 is thereby shielded. The diaphragm 112 is welded and joined integrally to an inner wall of the recess of the pressure input orifice 160, as is the case in the seventh embodiment. This diaphragm 112 is used to receive pressure of a measuring liquid. The hermetic terminal board 164 is configured as the end face plate that includes neither a pressure input orifice nor a diaphragm. However, the housing 152 is also similar to that of the other embodiments, in that the housing 152 is shielded and the internal space is kept vacuumed by an air vent unit which is not illustrated.

Inside the housing 152, a shaft (a force transmitting unit) 166 is set orthogonally to the central area 116 (see FIG. 9) of the inner surface of the diaphragm 112 and is positioned along the axis core of the housing 152. To a tip of the shaft 166, a movable portion 168 serving as a pressure sensitive element pedestal is provided integrally with the shaft 166. To the movable portion 168, one end of a pressure sensitive element 170 composed of a double-ended tuning fork resonator is installed in a manner that a detecting axis of the pressure sensitive element 170 is set coaxially with the shaft 166. The other end of the pressure sensitive element 170 is coupled with a pedestal 172 that protrudes inside and is provided to a center area of the hermetic terminal board 154 of the housing 152. As a consequence, when the diaphragm 112 for receiving pressure bends upon receipt of pressure of a measuring liquid, the shaft 166 moves in the axis direction. Generated along with the movement of the shaft 166 is an operation force, in the detecting axis direction, of the pressure sensitive element 170 connected to the movable portion 168. The other components are the same as those of the pressure sensor shown in the seventh embodiment. Therefore, the same components were allotted the same reference numbers, and descriptions thereof were not repeated. According to the eighth embodiment having such a structure, the pressure sensor for detecting absolute pressure is downsized and has high detection accuracy.

Note that the compositions of the diaphragms according to any of the embodiments may be combined freely. Namely, the diaphragms with reference to FIGS. 6 and 7 may include the ring 78 and the wall 88 as illustrated in FIGS. 4A, 4B, 5A, and 4B.

The entire disclosure of Japanese Patent Application No. 2009-00027764, filed Feb. 9, 2009 is expressly incorporated by reference herein.

What is claimed is:

1. A diaphragm for a pressure sensor, comprising
a central section serving as a diaphragm body, the central section including
an external surface deformed upon receipt of an external pressure; and
an internal surface transmitting a force to a pressure sensitive element inside a housing of the pressure sensor;
a peripheral section that is an exterior of the central section and is welded to an outer circumference of a pressure input orifice that is provided to the housing; and
a step wall provided between the central section and the peripheral section; wherein
the central section and the peripheral section are integrally and concentrically provided; and
the diaphragm seals the pressure input orifice.
2. The diaphragm for a pressure sensor according to claim 1, wherein the central section serving as the diaphragm body concentrically to the step wall.

3. The diaphragm for a pressure sensor according to claim 1, further comprising a ring having an outer shape corresponding to an inner circumference of the step wall and set in an inner circumferential surface of the step wall so as to restrain deformation of the step wall.

4. The diaphragm for a pressure sensor according to claim 1; wherein the diaphragm is made of a same material as a material for the housing.

5. A pressure sensor, comprising
the diaphragm for a pressure sensor according to claim 1, the peripheral section of the diaphragm being welded and surrounding the outer circumference of the pressure input orifice.

6. The pressure sensor according to claim 5, further comprising a heat insulating groove provided close to the peripheral section.

7. The pressure sensor according to claim 5; further comprising a countersunk part provided to an inner wall of the pressure input orifice, the countersunk part contacting the central section and a buffering section.

8. A diaphragm for a pressure sensor, comprising:
a disk-shaped diaphragm body that bends and deforms, upon receipt of an external pressure;
a cylinder section that is insertable in an inner wall surface of a pressure input orifice of a sensor housing; and provided integrally to a periphery of the diaphragm body; and
a step provided between a part weld-attached to the sensor housing and provided to an end edge of the cylinder section; and a peripheral section that becomes a bending point of the diaphragm body.

9. The diaphragm for a pressure sensor according to claim 8; further comprising a flange provided to the end edge of the cylinder section so that the diaphragm takes a hat shape; the flange being the part weld-attached to the housing.

10. The diaphragm for a pressure sensor according to claim 8, wherein the end edge of the cylinder section contacting an opened edge of the pressure input orifice is the part weld-attached to the sensor housing.

11. A pressure sensor, comprising
a housing including a pressure input orifice;
a diaphragm sealing the pressure input orifice of the housing; an outer surface of the diaphragm being a pressure receiving surface;
a force transmitting unit coupled to a central area of the diaphragm inside the housing and moving in a direction orthogonal to the pressure receiving surface while coordinating with the diaphragm; and
a pressure sensitive section coupled to the force transmitting unit and the housing; a detecting axis of the pressure sensitive section being set along an axis orthogonal to the pressure receiving surface of the diaphragm; wherein
the diaphragm includes
a disk-shaped diaphragm body that bends and deforms upon receipt of an external pressure;
a cylinder section that is insertable in an inner wall surface of a pressure input orifice of a sensor housing and is provided integrally to a periphery of the diaphragm body; and
a step provided between a part weld-attached to the sensor housing provided to an end edge of the cylinder section, and a peripheral section that becomes a bending point of the diaphragm body.

12. The pressure sensor according to claim 11; wherein the end edge of the cylinder section contacting an opened edge of the pressure input orifice is the part weld-attached to the sensor housing.

* * * * *